United States Patent
McDonald et al.

(10) Patent No.: US 8,055,916 B2
(45) Date of Patent: Nov. 8, 2011

(54) SYSTEM AND METHOD FOR DYNAMIC LOOP COMPENSATION FOR VOLTAGE MODE CONTROL

(75) Inventors: Brent McDonald, Round Rock, TX (US); George Richards, III, Round Rock, TX (US); Daniel Jenkins, Bastrop, TX (US)

(73) Assignee: Dell Products L.P., Round Rock, TX (US)

( * ) Notice: Subject to any disclaimer, the term of this patent is extended or adjusted under 35 U.S.C. 154(b) by 679 days.

(21) Appl. No.: 11/933,779

(22) Filed: Nov. 1, 2007

(65) Prior Publication Data
US 2009/0119519 A1    May 7, 2009

(51) Int. Cl.
*G06F 1/26* (2006.01)
(52) U.S. Cl. .................................. 713/300; 713/340
(58) Field of Classification Search .................. 713/300, 713/310, 340
See application file for complete search history.

(56) References Cited

U.S. PATENT DOCUMENTS

| | | | | |
|---|---|---|---|---|
| 5,646,513 | A * | 7/1997 | Riggio, Jr. | 323/285 |
| 5,919,262 | A * | 7/1999 | Kikinis et al. | 713/300 |
| 6,366,070 | B1 | 4/2002 | Cooke et al. | 323/284 |
| 7,042,200 | B2 | 5/2006 | Chen et al. | 323/283 |
| 7,239,257 | B1 * | 7/2007 | Alexander et al. | 341/138 |
| 2004/0246754 | A1 * | 12/2004 | Chapuis | 363/89 |
| 2006/0220625 | A1 * | 10/2006 | Chapuis | 323/282 |
| 2008/0010474 | A1 * | 1/2008 | Chapuis | 713/300 |

* cited by examiner

*Primary Examiner* — Chun Cao
*Assistant Examiner* — Paul Yanchus, III
(74) *Attorney, Agent, or Firm* — Hamilton & Terrile, LLP; Robert W. Holland

(57) ABSTRACT

A voltage regulator provides power to an information handling system component under management by a controller, such as a Buck circuit managed by a PID controller according to PID coefficient settings. An update module interfaced with the voltage regulator monitors operating conditions of the voltage regulator to update the coefficients used by the controller. For example, changes in the load applied to the voltage regulator and an inductance associated with the voltage regulator are used to periodically compute updated PID coefficients, which are then used by the controller to control the voltage regulator.

19 Claims, 5 Drawing Sheets

SYSTEM AND METHOD FOR DYNAMIC LOOP COMPENSATION FOR VOLTAGE MODE CONTROL

BACKGROUND OF THE INVENTION

1. Field of the Invention

The present invention relates in general to the field of information handling system power supply, and more particularly to a system and method for dynamic loop compensation for voltage mode control.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have grown in capability over time due, in part, to the increased number of calculations that are performed by the individual components used to build information handling systems, such as integrated circuits. However, over time, any particular integrated circuit may experience wide variations in the number of calculations that are performed. For example, a central processing unit (CPU) might perform at full capacity when executing intense mathematical operations yet use virtually no capacity when an information handling system is idle. As the number of calculations performed by an integrated circuit increases, the power consumed by the integrated circuit also typically increases. As a result, power demands for integrated circuits used in information handling systems can vary by an order of magnitude depending on the operations being performed by the information handling system. Typically, information handling systems include power regulating circuits that supply power to integrated circuits at a set voltage by varying the current applied at the integrated circuit. One example of a power regulating circuit is the Buck converter, which uses an inductor and two switches, such as a transistor and a diode. The switches open and close to alternately store energy from a power source into the inductor and discharge the inductor into the load.

In order to maintain the precise power requirements of an integrated circuit, power regulating circuits typically include a controller that uses an automatic compensation to control the application of power to the integrated circuit. For example, a Buck converter usually includes a feedback loop, such as a proportional-integral-derivative (PID) controller that drives the switches so that power applied to the integrated circuit stays within precise parameters. Although the feedback loop may use an analog circuit, typically the analog circuit is converted to digital control parameters used by a digital controller running on a microprocessor, microcontroller, state machine or other digital control embodiment. One difficulty with automatic compensation of a power regulator is that the compensation required for a lightly loaded voltage regulator is often vastly different from a heavily loaded voltage regulator. For example, the operation of a Buck converter in the continuous conduction mode (CCM) in which current remains greater than zero during each commutation cycle is very different from the discontinuous conduction mode (DCM) in which current is zero during a portion of each commutation cycle. The poles and zeros of the plants in a DCM system are not the same as those in a CCM system. As a result, Buck converters are often controlled with non-optimal compensation for both DCM and CCM operations to provide a sufficient stability margin for both cases.

SUMMARY OF THE INVENTION

Therefore, a need has arisen for a system and method that updates coefficients used by a controller to control output of a voltage regulator.

In accordance with the present invention, a system and method are provided which substantially reduce the disadvantages and problems associated with previous methods and systems for controlling a voltage regulator. Coefficients of a voltage regulator controller are updated based on operating conditions of the voltage regulator to maintain desired voltage regulator output parameters.

More specifically, information handling system processing components receive power from voltage regulators that regulate the power to maintain a desired voltage at the component. For example, a Buck circuit outputs a desired voltage to a CPU. The Buck circuit is controlled by a PID controller that manages operation of the Buck circuit using feedback error corrected according to PID coefficients. A coefficient update module monitors the operating conditions of the Buck circuit, such as load and inductance, to compute updated coefficients for use by the PID controller. The PID controller applies the updated coefficients so that voltage regulator response is optimal for the operating conditions. For example, PID coefficients are periodically updated based on operating conditions monitored at the Buck circuit. In one embodiment, coefficients are updated with transitions between CCM and DCM operations at the voltage regulator.

The present invention provides a number of important technical advantages. One example of an important technical advantage is that control coefficients used to manage output of a voltage regulator are automatically updated to adapt the control of the voltage regulator output to the operating conditions of a voltage regulator. Adapting PID controller coefficients optimizes voltage controller output even though the performance of the voltage regulator varies under different operating conditions, such as during CCM versus DCM modes of operation. More precise voltage control reduces the need for capacitance associated with the component under control to reduce the cost and complexity of the information handling system.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

Dynamic loop compensation for a voltage mode controller improves power delivery to information handling system components where power demands can vary by an order of magnitude or more. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
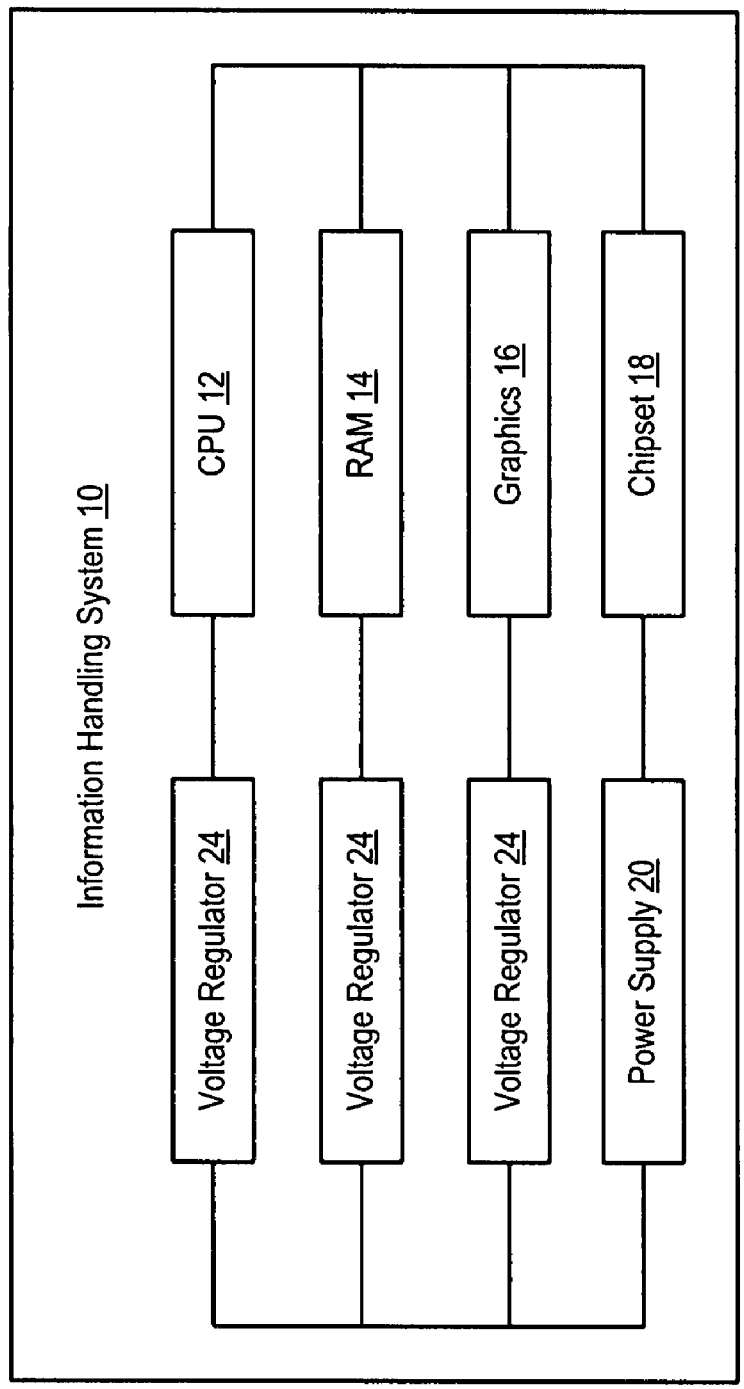
FIG. 1 depicts a block diagram of an information handling system having components powered with voltage regulators having voltage mode control.

Referring now to FIG. 1, a block diagram depicts an information handling system 10 having components powered with voltage regulators having voltage mode control. Information handling system 10 has a variety of processing components that cooperate to process information, such as a CPU 12, RAM 14, a graphics card 16 and a chipset 18. The processing components operate on DC power provided from a power supply 20. Power supply 20 communicates DC power through one or more power rails 22 to a voltage regulator 24 associated with each processing component. Each voltage regulator applies voltage mode control (VMC) to maintain a constant voltage as the power demanded by the associated processing component varies.

Figure 2:
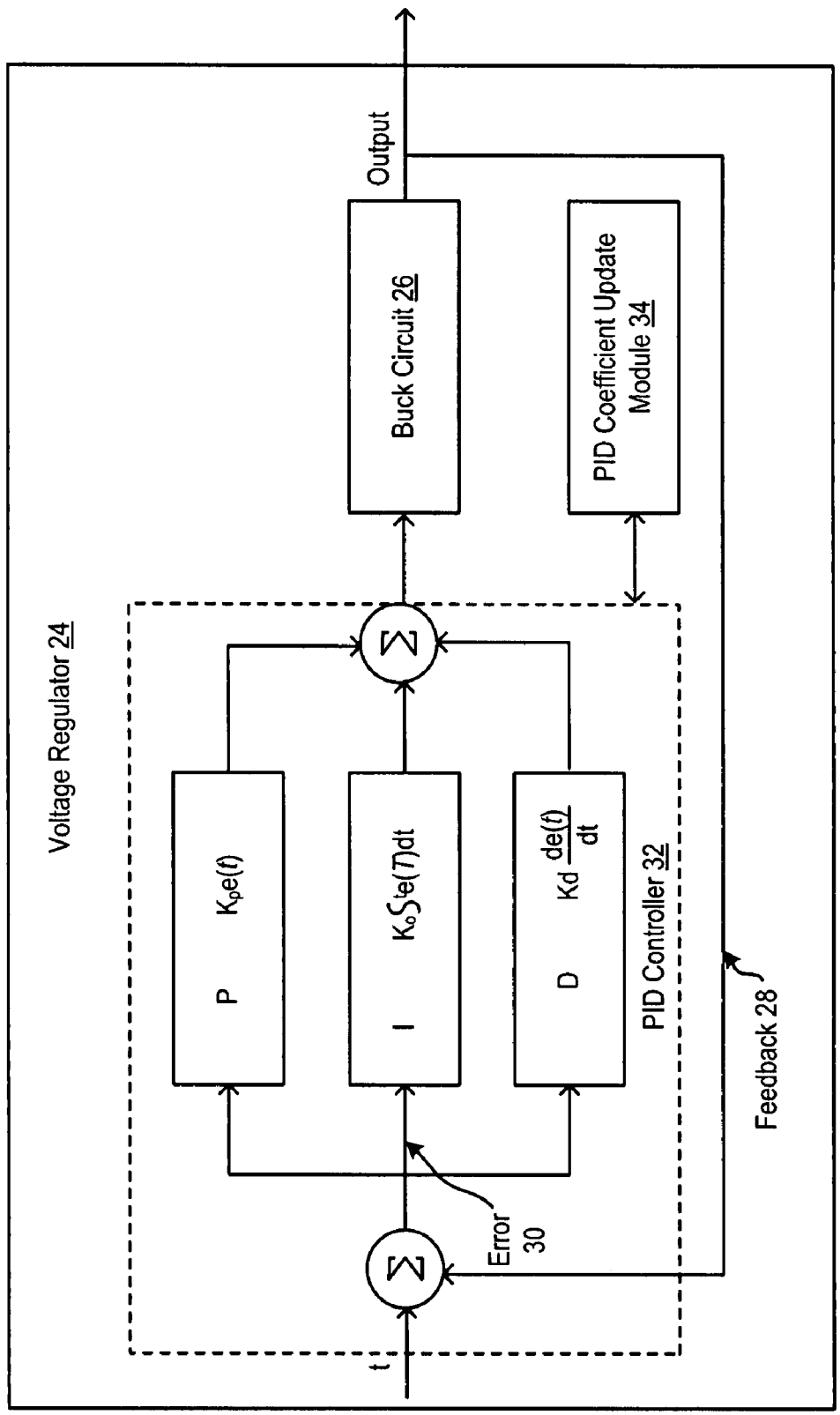
FIG. 2 depicts a block diagram of a voltage regulator having PID control.

Referring now to FIG. 2, a block diagram depicts a voltage regulator having PID control. A buck circuit 26 accepts an input voltage and outputs a regulated voltage as desired for the powered component. Buck circuit 26 maintains a voltage by regulating the amount of time that the input voltage is applied to the input of an LC filter. Feedback 28 from Buck circuit 26 provides an error 30 that is corrected based on the PID coefficients of the PID controller 32. For example, PID coefficients are a mathematical representation of an analog circuit, such as an LC circuit, that are used by a digital processor, such as a microprocessor, state machine or microcontroller that manages the output of Buck circuit 26. A PID coefficient update module 34 monitors the operation of Buck circuit 26 and alters the PID coefficients at predetermined operating conditions. For example, when Buck circuit 26 changes between CCM and DCM modes of control, PID coefficient update module 34 changes the PID coefficients between a first set of values associated with CCM control and a second set of values associated with DCM control. In one embodiment, PID coefficient update module 34 dynamically calculates optimal PID coefficient values to maintain optimal performance of PID controller 32.

Figure 3:
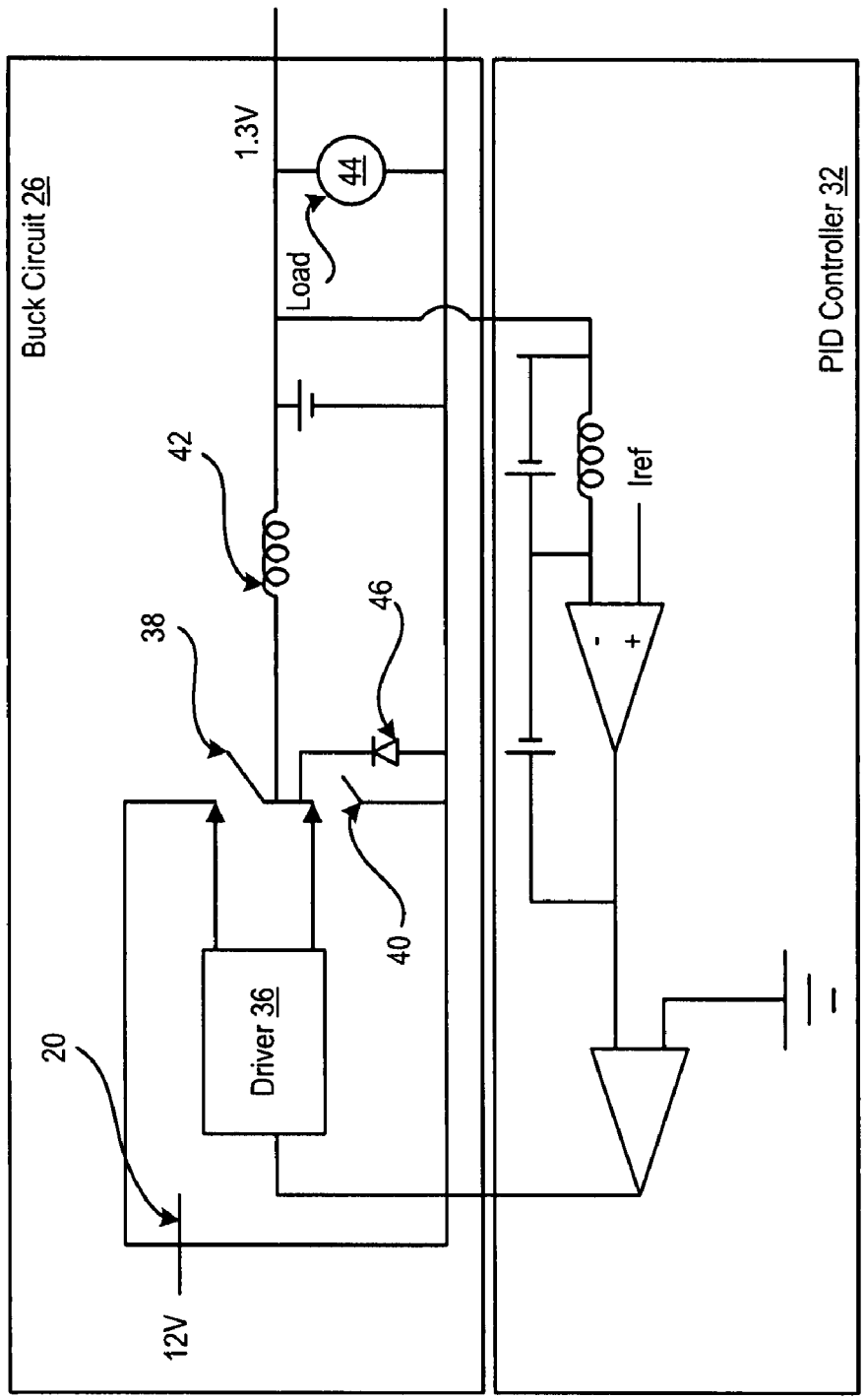
FIG. 3 depicts a circuit diagram of a Buck converter that provides voltage mode control with a PID controller.
Figure 4B:
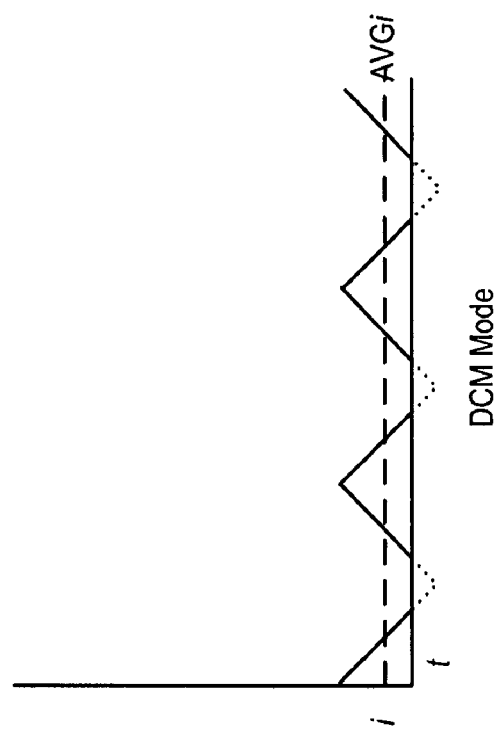
FIG. 4B depicts current over time for DCM mode control.
Figure 4A:
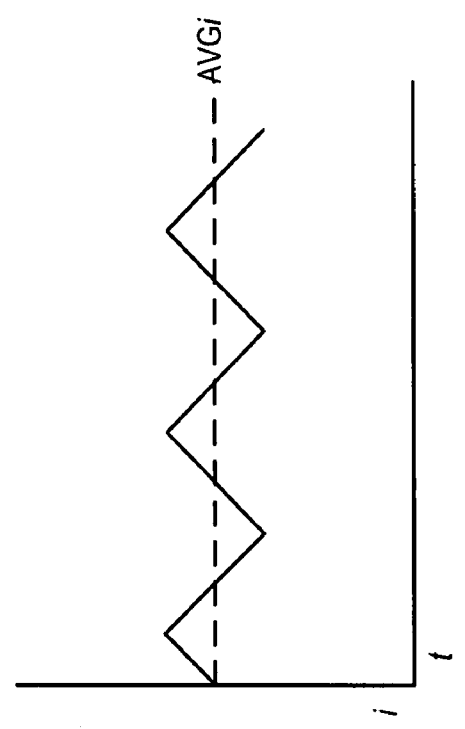
FIG. 4A depicts current over time for CCM mode control.

Referring now to FIG. 3, a circuit diagram depicts a Buck converter circuit 26 that provides voltage mode control with a PID controller 32. PID controller 32 is an analog LC circuit that interfaces with a driver 36. Driver 36 controls a high switch 38 and a low switch 40. High switch 38 turns on to provide current from a power source 20 to an inductor 42 and off to stop the current so that the voltage at load 44 remains at a desired level, such as 1.3V. As is depicted by FIG. 4A, as long as current flows from inductor 42 to load 44, i.e., current remains positive, Buck circuit 26 operates in CCM because the current remains continuously positive as switch 38 opens and closes. However, a diode 46 operates with low switch 40 to rectify any negative current flow, as is depicted by FIG. 4B, so that a discontinuous current exists where inductor 42 would otherwise flow current from load 44.

The degree of control exercised by PID controller 32, as represented by the LC circuit values or the PID coefficients, varies considerably depending upon whether Buck circuit 26 in operating in CCM versus DCM modes. PID coefficient update module 34 dynamically computes PID coefficients based on the current characteristics of Buck circuit 26 and applies the PID coefficients to modify PID controller 32 so that optimal performance is maintained. The inductance and load are determined by two current measurements during the on time of high side switch 38. In addition, the timing of the measurements is recorded along with the input voltage and output voltage taken at the inductor 42. Applying this information, PID coefficient update module 34 determines the inductance and the load resistance, which typically varying due to varying loads and soft core B/H characteristics. PID coefficient update module 34 uses the inductance and load resistance to compute PID coefficients that provide a maximal bandwidth and phase margin across the load range of Buck circuit 26. This reduces the output capacitance of Buck circuit 26 by one or two parts, resulting in a smaller and less expensive voltage regulator that provides improved performance.

As an example of a Buck circuit 26 having dynamically modified PID control coefficients, the following equations represent dynamic loop compensator using voltage mode control, such as a Buck circuit:

$$f(m, n) := n \cdot 10^m \cdot \text{Hz}$$

$$n := 1, 1.01 \ldots 10$$

$$m := 1 \ldots 6$$

$$s1(m, n) := j \cdot 2 \cdot \pi \cdot f(m, n)$$

$$V_{in} := 12 \cdot V$$

$$V_{RAMP} := 2 \cdot V$$

$$R := 0.02 \cdot \Omega$$

$$L := 0.5 \mu H$$

$$C := 1000 \mu F$$

$$G_{DC} := 10000 \cdot \text{Hz}$$

$$G_{VC}(s) := \frac{V_{in}}{V_{RAMP}} \cdot \frac{1}{s^2 \cdot L \cdot C + s \cdot \frac{L}{R} + 1}$$

$$G_{comp}(s) := -G_{DC} \cdot \frac{s^2 \cdot L \cdot C + s \cdot \frac{L}{R} + 1}{s}$$

$$G_T(s) := G_{VC}(s) \cdot G_{comp}(s)$$

A PID compensator for the voltage mode control is defined as:

$$K_P + \frac{K_I}{s} + s \cdot K_D \frac{s^2 \cdot K_D + s \cdot K_P + K_I}{s}$$

$$K_I + \frac{s^2 \cdot \frac{K_D}{K_I} + s \cdot \frac{K_P}{K_I} + 1}{s} = G_{DC} \cdot \frac{s^2 \cdot L \cdot C + s \cdot \frac{L}{R} + 1}{s}$$

Solving for the coefficients $K_P$, $K_D$, and $K_I$ yields an optimal compensation. These coefficients are calculated in real time through logic on a microcontroller, state machine, or microprocessor using inputs measuring voltage and current at critical nodes. As an example, with a Buck circuit voltage regulator having a 50 A load current the following represents the voltage regulator and PID controller:

$$f_s := 300 \text{KHz}$$

$$V_{out} := 1.8 \cdot V$$

$$V_{in} := 12 \cdot V$$

$$D := \frac{V_{out}}{V_{in}}$$

$$I_{out} := \frac{V_{out}}{R}$$

$$\Delta I_L := \frac{V_{in} - V_{out}}{L} \cdot \frac{D}{f_s}$$

$$I_L(t) := \left| I_{out} - \frac{\Delta I_L}{2} + \frac{\Delta I_L \cdot f_s}{D} \cdot \text{mod}\left(t, \frac{1}{f_s}\right) \right| \text{ if } \text{mod}\left(t, \frac{1}{f_s}\right) < \frac{D}{f_s} t_d$$

$$= 40 \cdot \text{ns}$$

$$\left| I_{out} - \frac{\Delta L_L}{2} + \frac{\Delta L_L - f_s}{1 - D} \cdot \left(\text{mod}\left(t, \frac{1}{f_s}\right) - \frac{D}{f_s}\right) \right| \text{ otherwise } t := 0 \cdot \text{sec},$$

$$\frac{1}{1000 \cdot f_s} \ldots \frac{1}{f_s}$$

Figure 5:
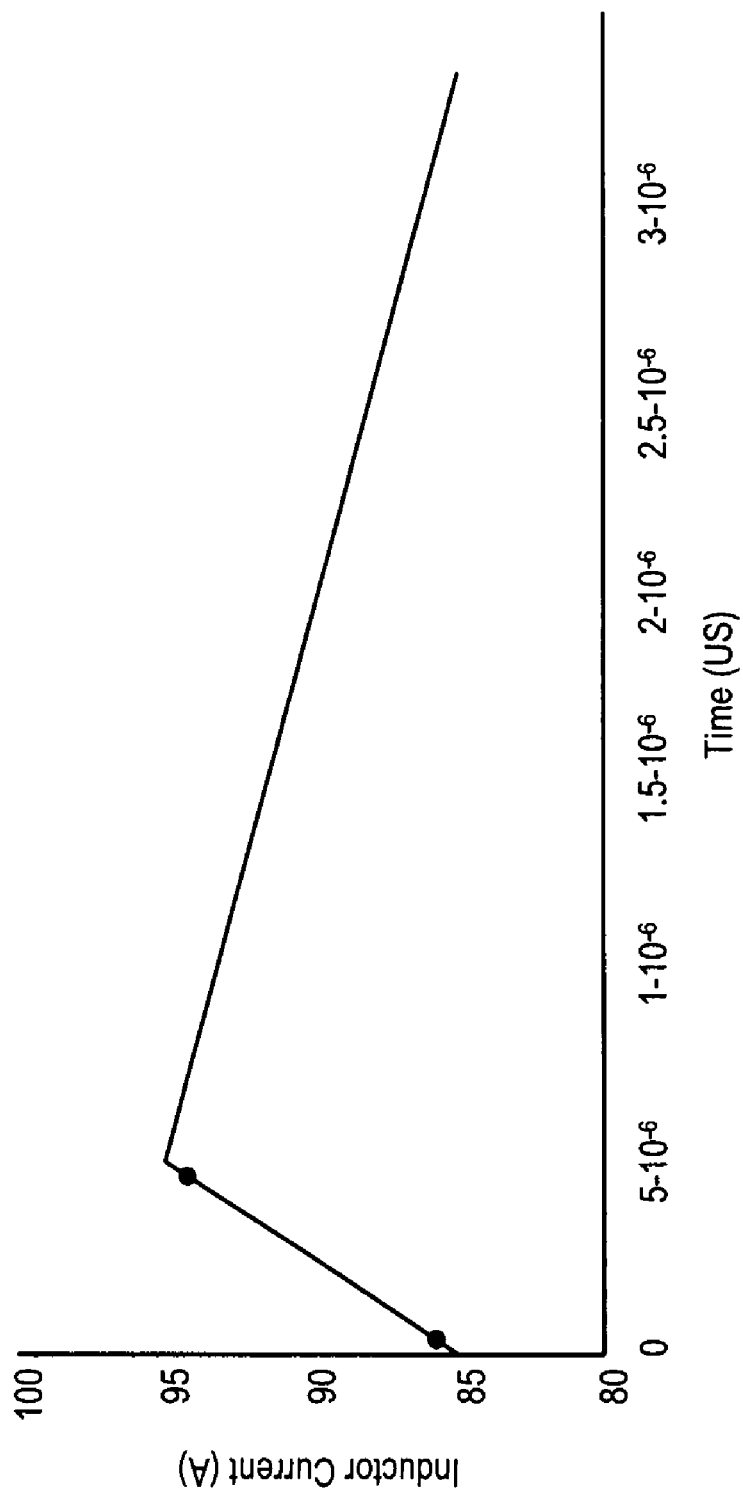
FIG. 5 depicts inductor current measurements over time.

FIG. 5 depicts inductor current measurements at two points over time that are used by PID coefficient update module 34 to estimate inductance and resistance values where capacitance values are set at a predetermined amount:

$$L_{est} := \frac{V_{in} - V_{out}}{I_L\left(\frac{D}{f_s} - t_d\right) - IL(0 \cdot \sec + t_d)} \cdot \left(\frac{D}{f_s} - 2 \cdot t_d\right)$$

$$L_{est} = 0.5 \mu H$$

$$R_{est} := \frac{2 \cdot V_{out}}{I_L\left(\frac{D}{f_s} - t_d\right) + IL(0 \cdot \sec + t_d)}$$

$$R_{est} = 0.02 \Omega$$

$$\frac{V_{out}}{R_{est}} = 90 A$$

The inductance and resistance values are used to solve for PID coefficients to achieve a predetermined desired bandwidth, with the bandwidth constraint hidden in the $G_{DC}$ term:

$$K_I := G_{DC}$$

$$K_I := 1 \times 10^4 \frac{1}{s}$$

$$K_P := K_I \cdot \frac{L}{R}$$

$$K_P := 0.25$$

$$K_D := K_I L \cdot C$$

$$K_D := 5 \times 10^6 - s$$

The results for the PID coefficients provide an optimal compensation for a VMC regulator. By actively measuring the inductance and resistance values, the optimum compensation can be updated as desired. As an example, PID values are updated periodically or at predetermined thresholds, such as changes between CCM and DCM control modes.

Although the present invention has been described in detail, it should be understood that various changes, substitutions, and alterations can be made hereto without departing from the spirit and scope of the invention as defined by the appended claims.

What is claimed is:

1. An information handling system comprising:
   plural processing components operable to cooperate to process information;
   at least one voltage regulator associated with at least one of the processing components, the voltage regulator operable to maintain a predetermined voltage to the processing component;
   a controller interfaced with the voltage regulator, the controller operable to control operation of the voltage regulator based on one or more coefficients; and
   a controller coefficient update module interfaced with the controller and voltage regulator, the controller coefficient update module operable to update the one or more coefficients based upon one or more predetermined operating conditions, the predetermined operating conditions including at least one of a voltage or current operating condition measured at the controller and having a first set of one or more coefficients for a continuous conduction mode and a second set of one or more coefficients for a discontinuous conduction mode.

2. The information handling system of claim 1 wherein the voltage regulator comprises a Buck circuit.

3. The information handling system of claim 2 wherein the controller comprises a PID controller having PID coefficients.

4. The information handling system of claim 3 wherein the predetermined operating conditions comprise a load of the processing component placed on the voltage regulator.

5. The information handling system of claim 4 wherein the predetermined operating conditions comprise inductance associated with the voltage regulator.

6. The information handling system of claim 1 wherein the coefficients comprise at least one coefficient computed at the voltage regulator from real time measurements of the operating conditions at the voltage regulator.

7. The information handling system of claim 1 wherein the controller comprises a state machine.

8. The information handling system of claim 1 wherein the controller comprises a microcontroller.

9. The information handling system of claim 1 wherein the controller comprises a microprocessor.

10. A method for controlling voltage at an information handling system processing component, the method comprising:
    providing power to the processing component through a voltage regulator;
    controlling the output of the voltage regulator with a controller having one or more coefficients;
    monitoring one or more predetermined operating conditions of the voltage regulator, the one or more predetermined operating conditions measured as one or more of a voltage or current; and
    updating the controller coefficients in response to the predetermined operating conditions by computing one or more controller coefficients from measurements of the operating conditions made at the voltage regulator, the one or more predetermined operating conditions comprising at least an inductance associated with the voltage regulator.

11. The method of claim 10 wherein the voltage regulator comprises a Buck circuit.

12. The method of claim 10 wherein the controller comprises a PID controller having PID coefficients.

13. The method of claim 12 wherein updating the controller coefficients further comprises updating the PID coefficients in response to a load placed on the voltage regulator.

14. The method of claim 12 wherein updating the controller coefficients further comprises updating the PID coefficients in response to a chance in the inductance associated with the voltage regulator.

15. The method of claim 12 wherein updating the controller coefficients further comprises periodically computing PID coefficients with the predetermined operating conditions.

16. The method of claim 12 wherein updating the controller coefficients further comprises updating the controller coefficients upon detection of a transition between continuous conduction mode and discontinuous conduction mode.

17. A voltage regulator comprising:
    a Buck circuit operable to accept power and output a predetermined voltage;
    a PID controller interfaced with the Buck circuit and operable to control operation of the Buck circuit to output the predetermined voltage with a desired response according to PID coefficients; and
    a PID coefficient update module interfaced with the Buck circuit and the PID controller and operable to update the PID coefficients based on an inductance measured at the Buck circuit by computing at least one PID coefficient from measurements of the inductance.

18. A voltage regulator comprising:
    a Buck circuit operable to accept power and output a predetermined voltage;
    a PID controller interfaced with the Buck circuit and operable to control operation of the Buck circuit to output the predetermined voltage with a desired response according to PID coefficients; and
    a PID coefficient update module interfaced with the Buck circuit and the PID controller and operable to update the PID coefficients based on an operating condition measured at the Buck circuit by computing at least one PID coefficient from measurements of the operating condition, wherein the operating condition comprises a transition between a continuous conduction mode and an discontinuous conduction mode.

19. A method for controlling voltage at an information handling system processing component, the method comprising:
    providing power to the processing component through a voltage regulator;
    controlling the output of the voltage regulator with a controller having one or more coefficients;
    monitoring one or more predetermined operating conditions of the voltage regulator, the one or more predetermined operating conditions measured as one or more of a voltage or current; and
    updating the controller coefficients in response to the one or more predetermined operating conditions by computing one or more controller coefficients from measurements of the one or more predetermined operating conditions made at the voltage regulator, the one or more predetermined operating conditions comprising at least detection of a transition between continuous conduction mode and discontinuous conduction mode.

* * * * *